United States Patent
Rovik et al.

(10) Patent No.: US 9,834,218 B2
(45) Date of Patent: Dec. 5, 2017

(54) SYSTEMS AND METHODS FOR DETERMINING ACTION AT TRAFFIC SIGNALS

(71) Applicant: Toyota Motor Engineering & Manufacturing North America, Inc., Erlanger, KY (US)

(72) Inventors: Christopher Lee Rovik, Northville, MI (US); Eric Randell Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 16 days.

(21) Appl. No.: 14/925,194

(22) Filed: Oct. 28, 2015

(65) Prior Publication Data

US 2017/0120923 A1    May 4, 2017

(51) Int. Cl.
| | |
|---|---|
| A01B 69/00 | (2006.01) |
| B60W 30/18 | (2012.01) |
| B60W 10/20 | (2006.01) |
| B60W 10/18 | (2012.01) |

(52) U.S. Cl.
CPC ...... *B60W 30/18154* (2013.01); *B60W 10/18* (2013.01); *B60W 10/20* (2013.01); *B60W 2550/12* (2013.01); *B60W 2550/148* (2013.01); *B60W 2550/22* (2013.01); *B60W 2710/18* (2013.01); *B60W 2710/20* (2013.01); *B60W 2720/106* (2013.01)

(58) Field of Classification Search
CPC .................................. B60W 10/00; G01C 5/06
USPC ......... 701/36, 41, 29.8, 29.9, 32.4; 340/901, 340/903, 905
See application file for complete search history.

(56) References Cited

U.S. PATENT DOCUMENTS

| | | |
|---|---|---|
| 5,940,010 A | 8/1999 | Sasaki et al. |
| 6,405,132 B1 | 6/2002 | Breed et al. |
| 6,516,273 B1 | 2/2003 | Pierowicz et al. |
| 7,587,271 B2 | 9/2009 | Kiim |
| 7,983,836 B2 | 7/2011 | Breed |
| 8,620,032 B2 | 12/2013 | Zeng |
| 8,643,506 B2 | 2/2014 | Yamada |
| 8,996,234 B1 * | 3/2015 | Tamari ................. G07C 5/0808 701/123 |
| 2009/0105921 A1 * | 4/2009 | Hanatsuka ......... B60G 17/0165 701/80 |
| 2009/0295598 A1 | 12/2009 | Denaro |
| 2010/0109908 A1 | 5/2010 | Miura |
| 2013/0233083 A1 * | 9/2013 | Hofelsauer .............. G01H 1/12 73/649 |
| 2013/0253754 A1 | 9/2013 | Ferguson et al. |

FOREIGN PATENT DOCUMENTS

EP    2824647 A1    1/2015

* cited by examiner

*Primary Examiner* — Gertrude Arthur Jeanglaude
(74) *Attorney, Agent, or Firm* — Dinsmore & Shohl LLP (57) ABSTRACT

A system and method for use in an automotive vehicle configured to determine an action to be taken as the automotive vehicle approaches a traffic signal. The system and method determines a distance to stop, and processes the state of the traffic signal, and the road surface condition to calculate the action to be taken so as to help the driver make decisions when approaching the traffic signal.

16 Claims, 6 Drawing Sheets

SYSTEMS AND METHODS FOR DETERMINING ACTION AT TRAFFIC SIGNALS

TECHNICAL FIELD

Embodiments of the present disclosure are directed to systems and methods for determining an action to be taken by an automotive vehicle approaching a traffic signal and more particularly, to systems and methods that determine a surface condition of a road to calculate a distance to stop, wherein the distance of stop is processed to determine the action to be taken by the automotive vehicle.

BACKGROUND

Drivers face many decisions when approaching a traffic signal. In the event of a green traffic signal, the driver must determine if the light will change to yellow and if the driver should continue at the present speed or reduce speed. If the light is yellow the driver must determine whether the driver should stop the vehicle or continue through. The distance to stop may be affected by the surface conditions of the road. Accordingly it may be desirable to have systems and methods configured to determine an action to be taken by an automotive vehicle approaching a traffic signal based upon the surface condition of a road.

SUMMARY

In one embodiment, a system for use in an automotive vehicle configured to determine an action to be taken as the automotive vehicle approaches a traffic signal includes a first sensor unit. The first sensor unit is configured to provide a speed of the automotive vehicle and determine a distance between the automotive vehicle and the traffic light. The system further includes a second sensor unit, a data processing unit and a third sensor unit. The second sensor unit is configured to detect the state of the traffic light. The data processing unit is configured to receive the state of the traffic light, the speed of the automotive vehicle and the distance between the automotive vehicle and the traffic light and the surface condition of the road driven on by the automotive vehicle so as to determine the action to be taken by the automotive vehicle. The third sensor unit is configured to detect a surface condition of a road driven on by the automotive vehicle as the automotive vehicle approaches the traffic signal. The action to taken by the vehicle may be to either slow down to a stop at the traffic light or continue through the traffic light.

In another embodiment, the method for determining an action of an automotive vehicle to be taken as the automotive vehicle approaches a traffic signal includes detecting a speed of the automotive vehicle within a predetermined distance of the traffic signal, determining a distance between the automotive vehicle and the traffic light, detecting the state of the traffic light, and detecting a surface condition of a road driven on by the automotive vehicle. The method further includes processing the state of the traffic light, the speed of the automotive vehicle, the distance between the automotive vehicle and the traffic light, and the surface condition of the road driven on by the automotive vehicle so as to determine the action to be taken by the automotive vehicle, wherein the action is to either slow down to a stop at the traffic light or continue through the traffic light.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION

Embodiments of the present disclosure are directed to systems and methods for use in an automotive vehicle and configured to determine an action to be taken as the automotive vehicle approaches a traffic signal. Embodiments described herein automatically determine the action, such as braking, steering or maintaining course and speed, to be taken as the automotive vehicle approaches the traffic signal by taking into account the speed of the automotive vehicle, the distance between the automotive vehicle and the traffic signal, the state of the traffic signal, and the surface condition of the road so as to determine an action to be taken as the automotive vehicle approaches the traffic signal. The action may be presented audibly through the automotive vehicle's speakers, visually in the form of a text message displayed on the automotive vehicle's head unit, or may be executed by an active control system of the automotive vehicle.

Figure 1:
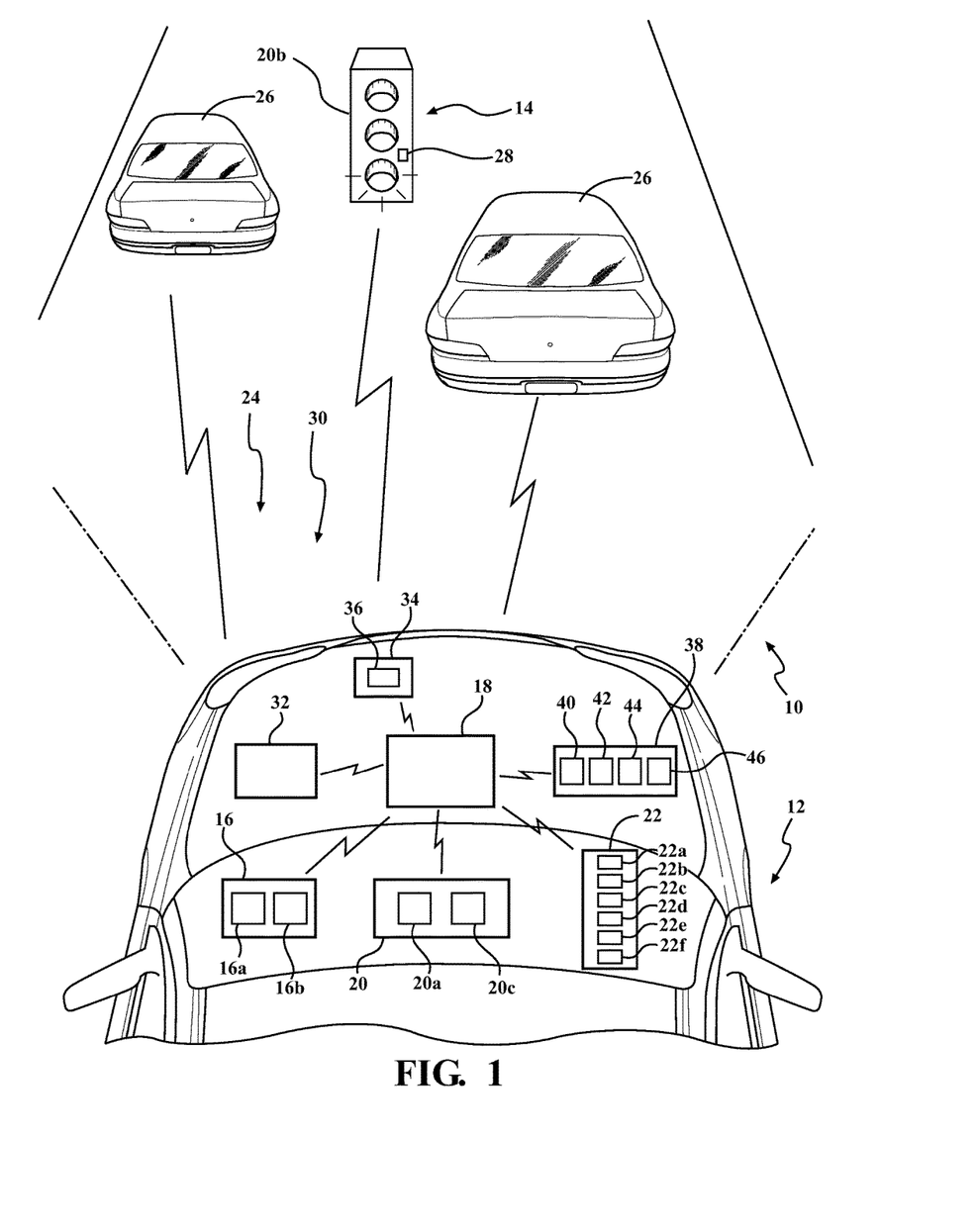
FIG. 1 schematically depicts a diagram of a system for determining an action to be taken as the automotive vehicle approaches a traffic signal according to one or more embodiments described and illustrated herein.

With reference now to FIG. 1, a schematic diagram of an example of the system 10 configured for use in an automotive vehicle 12 is provided. The system 10 is configured to determine an action to be taken as the automotive vehicle 12 approaches a traffic signal 14.

The system 10 includes a first sensor unit 16, a second sensor unit 20 and a third sensor unit 22 communicatively coupled to a data processing unit 18. For instance, the first sensor unit 16, the second sensor unit 20 and the third sensor unit 22 may be coupled to the data processing unit 18 by a wired communication line or wirelessly. The data processing unit 18 is a processor capable of executing computer readable instructions.

The first sensor unit 16 is configured to provide a speed of the automotive vehicle 12 and determine a distance between the automotive vehicle 12 and the traffic signal 14. The first sensor unit 16 is illustratively shown a speedometer 16*a* and a radar 16*b*. The speedometer 16*a* is configured to provide the speed of the automotive vehicle 12 and the radar 16*b* is configured to provide the distance between the automotive vehicle 12 and the traffic signal 14.

It should be appreciated that the first sensor unit 16 may be other devices or system currently known or yet to be developed configured to determine the speed of the automotive vehicle 12 and the distance between the automotive vehicle 12 and the traffic signal 14, illustratively including a Global Position System 16c ("GPS"). The GPS 16c may be configured to determine the location of the automotive vehicle 12 and the location of the traffic signal 14. The GPS 16c may include a receiver configured to receive satellite signals and GPS processing unit configured to processing the satellite signals so as to determine a location. The data processing unit 18 may processes the change in the location of the automotive vehicle 12 to calculate the speed of the automotive vehicle 12 as well as provide a distance between the automotive vehicle 12 and the traffic signal 14.

The system 10 includes a second sensor unit 20 configured to detect the state of the traffic signal 14. For example, a first state of the traffic signal may be a green signal indicating to the automotive vehicle to go, a second state may be a yellow signal indicating to the automotive vehicle to yield, and a third state may be a red signal indicating to the automotive vehicle to stop. FIG. 1 illustratively shows the second sensor unit 20 being a camera 20a capable of generating a camera image 20b (e.g. a still image or a video image).

The data processing unit 18 is configured to process a camera image 20b so as to detect the state of the traffic signal 14. However, it should be appreciated that the second sensor unit 20 may be other devices configured to receive traffic signal 14 information. For instance, the second sensor unit 20 may be a short range wireless antenna 20c, a non-limiting example of a short range wireless antenna is an antenna operating at 75 MHz spectrum in the 5.9 GHz band, such as an antenna commonly referenced as the "Button Patch Antenna", configured to receive a wireless signal from a traffic signal 14 indicating the state of the traffic signal 14. It should be appreciated by those skilled in the art that the frequency band and spectrum are provided herein for illustrative purposes are not limiting to the scope of the appended claims. The state of the traffic signal 14 may include the phase signal and timing of the traffic light.

The third sensor unit 22 is configured to detect a surface condition 24 of a road driven on by the automotive vehicle 12. The third sensor unit 22 may be configured to detect moisture so as to make a determination of a wet road condition. For example, the third sensor unit 22 may be a rain sensor 22a such as those used in automotive vehicles 12 equipped with automatic wipers, and illustratively include an infrared sensor configured to detect an infrared light source. Accordingly, the rain sensor 22a is configured to detect rain fall on the windshield of the automotive vehicle 12. The data processing unit 18 receives data from the rain sensor 22a and makes a determination as to whether there is precipitation and processes the detection of precipitation so as to determine that surface condition 24 of a road is wet.

As shown in FIG. 1, in some embodiments, the third sensor unit 22 may further include a thermometer 22c. Information gathered from the thermometer 22c and the rain sensor 22a may be further processed to determine the surface condition 24 of the road. For instance, an indication from the rain sensor 22a that precipitation is present may be coupled with the air temperature detected by the thermometer 22c to determine that the road surface condition 24 is snow, with ice or slush, or is just wet.

The third sensor unit 22 may be configured as a short range wireless antenna 20c configured to receive surface conditions 24 from a remote source, such as a system vehicle 26 or a traffic information feed 28. The traffic information feed 28 may be provided by the traffic signal 14, or may be transmitted to the automotive vehicle 12 through a wireless network such as (e.g., a cellular or satellite network). As another example, the third sensor unit 22 may be configured as a camera 22d and an image processer 22e. The camera 22d is configured to film the road surface and the image processor 22e is configured to process the camera image 20b so as to determine if the road surface condition 24 is dry, snow, with ice or slush, or is just wet. Alternatively, the camera 22d may transmit a camera image 20b to the data processing unit 18 and the data processing unit 18 may process the camera image 20b so as to determine the road surface condition 24.

The system 10 may be further configured to process a type of road 30 the automotive vehicle 12 is driven on. For instance, the third sensor unit 22 may further include a vibration sensor 22f. The vibration sensor 22f may be an accelerometer. The accelerometer 22f may be mounted to a steering tie or suspension arm of the automotive vehicle 12. The accelerometer 22f detects the movement of the steering tie or the suspension arm. The movement of the suspension arm/steering tie may be processed to determine how much vibration the automotive vehicle 12 is experiencing. The data processing unit 18 may be further configured to process the vibration of the automotive vehicle 12 so as to determine a type of road 30 the automotive vehicle 12 is being driven on. For instance, if the vibration is below a first predetermined threshold, the data processing unit 18 determines that the type of road 30 is paved. If the vibration is above the first predetermined threshold, the data processing unit 18 determines that the type of road 30 may be one of dirt or gravel. Information from the camera 20a may be further used to determine whether the type of road 30 is dirt or gravel. In another aspect of the third sensor, the camera image 20b taken from the camera 20a may be processed by the image processor to determine the type of road 30 being driven on. The third sensor unit may include one or more of components 22a-22f.

As described above, the data processing unit 18 is configured to receive the state of the traffic signal 14, the speed of the automotive vehicle 12 and the distance between the automotive vehicle 12, the traffic signal 14 and the road surface condition 24. The data processing unit 18 is further configured to process the state of the traffic signal 14, the speed of the automotive vehicle 12, the distance between the automotive vehicle 12 and the traffic signal 14, and the surface condition 24 of the road driven on by the automotive vehicle 12 so as to determine the action to be taken by the automotive vehicle 12, example actions include, but are not limited to, slowing down to a stop at the traffic signal 14 or continuing through the traffic signal 14.

The system 10 may be further configured to determine a distance to stop. The distance to stop being the distance the automotive vehicle 12 needs to come to a complete stop utilizing the brakes 32. The distance to stop is processed by taking into account the speed of the automotive vehicle 12 and the coefficient of friction of the road surface. The coefficient of friction may change based upon the surface condition 24 of the road and the type of road 30.

In some embodiments, the system 10 may include a non-transitory computer readable storage device that stores a database 34. In embodiments, the database 34 stores a list of coefficient of frictions 36 of various road surfaces. Table 1 below lists examples of coefficient of friction for various road surfaces

TABLE 1

Example Frictional Coefficients For Car Tires on Road Surfaces

| Surface Type | f-value |
| --- | --- |
| gravel and dirt road | 0.35 |
| wet, grassy field | 0.20 |
| dry asphalt | 0.65 |
| wet asphalt | 0.50 |
| dry concrete | 0.75 |
| wet concrete | 0.60 |
| snow covered | 0.20-0.25 |
| ice | 0.10-0.15 |
| loose moist dirt that allows tire to sink about 2" (5 cm) | 0.60-0.65 |

For clarity, "F-value" is the coefficient of friction for the respective Type of Road 30, and the Type of Road 30 is provided with a road surface condition 24. For example, a Type of Road 30 that is concrete, and having a road surface condition 24 that is dry, has a coefficient of friction of 0.75.

Table 2 provided below provides a list of an initial coefficient-"fi", a constant "C" for a type of road. The values may be used to determine a coefficient of friction for the type of road 30 and the road surface condition 24 utilizing the equation $f=f_i-cv$, where f is the coefficient of friction and v is velocity in ft/sec units.

TABLE 2

Typical Values for Solution of "f"

| conditions | $f_1$ | c |
| --- | --- | --- |
| dry concrete | 0.85 | 0.0017 |
| wet concrete | 0.70 | 0.0034 |

Accordingly, the distance to stop may change for a given type of road 30 based upon the surface condition 24 of the type of road 30. For example, a distance to stop for a dry concrete road will be shorter than the distance to stop a wet concrete road, assuming the speed of the automotive vehicle 12 is the same in each instance.

In some embodiments, the system 10 may be configured to provide a verbal instruction relaying the action to be taken as the automotive vehicle 12 approaches the traffic signal 14 to the driver of the automotive vehicle 12 through a speaker. Alternatively, or in addition to, the system 10 may be configured to execute the action to be taken. In such an embodiment, the system 10 includes an active control system 38. The data processing unit 18 process the state of the traffic signal 14, the speed of the automotive vehicle 12, the distance between the automotive vehicle 12 and the traffic signal 14, the type of road 30, and the surface condition 24 of the road so as to determine the action to be taken by the automotive vehicle. The action to be taken by the automotive vehicle is transmitted to the active control system 38 and executed by the active control system 38.

The active control system 38 may include an active steering system 40 that controls the steering of the automotive vehicle 12, an active braking system 42 that controls the braking of the automotive vehicle 12, and an active acceleration system 44 that controls the acceleration of the automotive vehicle 12. It should be understood that the action to be taken by the automotive vehicle as determined by the system 10 may include the execution of only one or a combination of the systems 40, 42, 44 of the active control system 38. For example the system 10 may determine that the automotive vehicle 12 should stop when the traffic signal 14 is green and thus, only the active braking system 42 is executed.

Still referring to FIG. 1, the system 10 may be incorporated in a vehicle-to-vehicle communication system 46. In such embodiments, the automotive vehicle 12 may be configured with a short range wireless antenna 20c configured to transmit information to system vehicles 26 and receive information from system vehicles 26. For use herein, a system vehicle 26 is a vehicle configured to communicate with the automotive vehicle 12. In particular, the automotive vehicle 12 may be configured to receive system vehicle information 48. As used herein, system vehicle information 48 includes the distance between the system vehicle 26 and the automotive vehicle 12 and the speed of the system vehicle 26. The system vehicle information 48 is processed by the data processing unit 18 along with the distance to stop, the state of the traffic signal 14, the speed of the automotive vehicle 12, the distance between the automotive vehicle 12 and the traffic signal 14, and the surface condition 24 of the road driven on by the automotive vehicle 12 so as to determine the action to be taken by the automotive vehicle 12.

Figure 2:
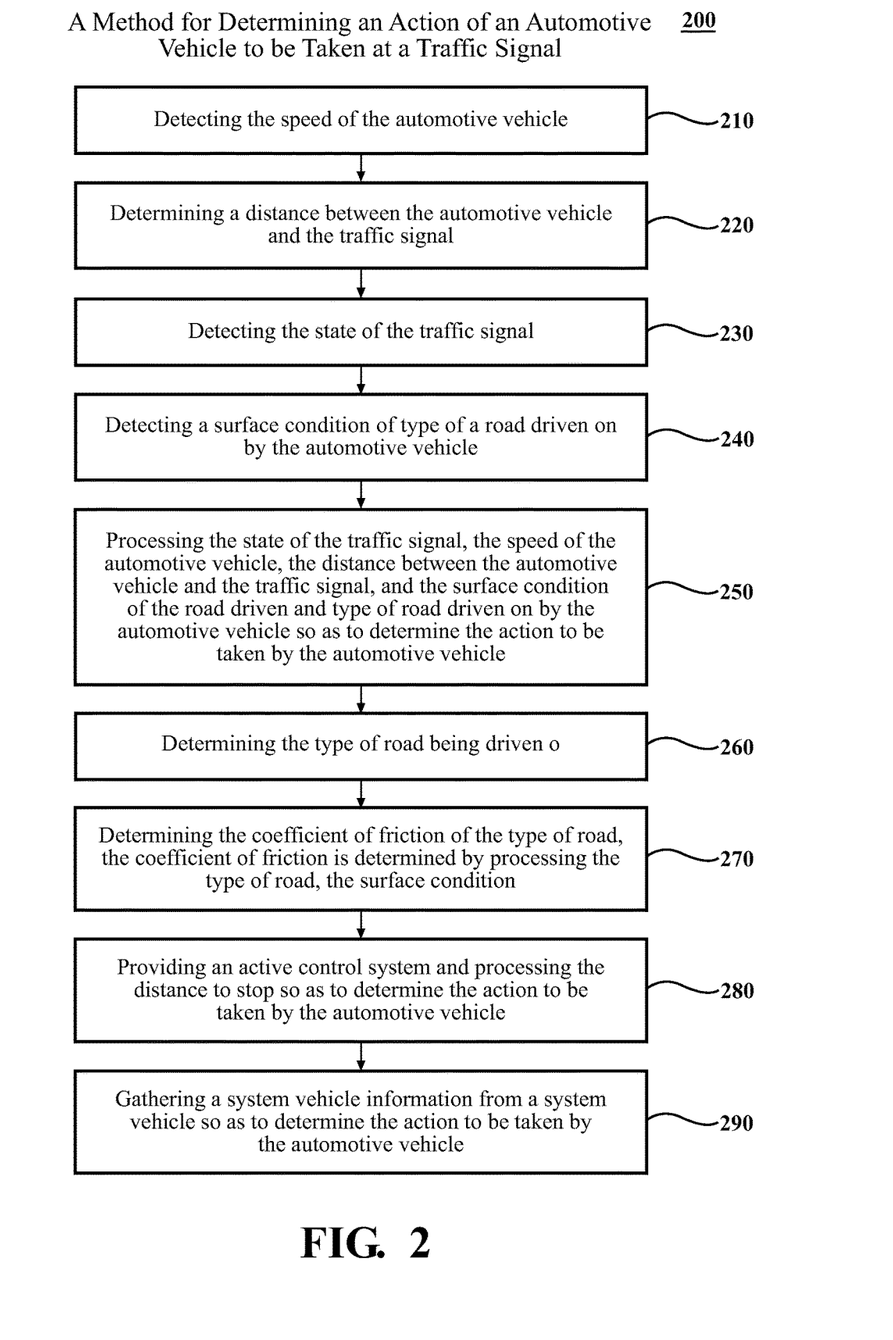
FIG. 2 schematically depicts an overhead view of an automotive vehicle approaching a traffic signal on a dry road.

With reference now to FIG. 2, a method 200 for determining an action of an automotive vehicle 12 to be taken at a traffic signal 14 is provided. The method includes block 210, detecting the speed of the automotive vehicle 12 within a predetermined distance of the traffic signal 14. Block 210 may be performed by providing a first sensor unit 16 and a data processing unit 18. The first sensor unit 16 may include a speedometer 16a.

The method includes block 220, determining a distance between the automotive vehicle 12 and the traffic signal 14. Block 220 may be performed by providing a first sensor unit 16 having a radar 16b. The radar 16b is configured to provide the distance between the automotive vehicle 12 and the traffic signal 14. Block 220 may also be performed by a first sensor unit 16, having a speedometer 16a and a camera 20a so as to determine the distance and speed of the automotive vehicle 12. The speedometer 16a is configured to provide the speed of the automotive vehicle 12 and the camera 20a is configured to provide a camera image 20b. The camera image 20b is a field of view forward of the automotive vehicle 12, and the camera image 20b is processed by a data processing unit 18 so as to provide the distance between the automotive vehicle 12 and the traffic signal 14.

The method includes block 230, detecting the state of the traffic signal 14. The state of the traffic signal 14 is one of green, yellow and red. Block 230 may be performed by a second sensor unit 20. The second sensor unit 20 may be a camera 20a having an image processor configured to process a camera image 20b so as to detect the state of the traffic signal 14. Alternatively, the data processing unit 18 may be configured to process the camera image 20b so as to detect the state of the traffic signal 14.

The method 200 further includes block 240, detecting a surface condition 24 of and the type of road 30 driven on by the automotive vehicle 12. As used herein, the surface condition 24 of the road is a one of either dry, wet, snow, snow with ice or snow with slush. The surface condition 24 of the road may be detected by a third sensor unit 22. The third sensor unit 22 may be a camera 20a having an image processor. The camera 20a may be mounted to a windshield of the automotive vehicle 12 and oriented so as to capture an image of the traffic signal 14 as well as the road. Accordingly, it should be appreciated that the same camera 20a and image processor used to detect the traffic signal 14 may be used to detect the surface condition 24 of the road.

In another aspect, block 240 may be performed by providing a third sensor having a rain sensor 22a. The rain sensor 22a unit is configured to detect precipitation. The data processing unit 18 processes the rain fall so as to determine surface condition 24 of a road driven. The rain sensor 22a may be utilized in combination with an automatic windshield wiper system 10. The third unit may further include a thermometer 22c so as to provide a temperature reading of the environment. The data processing unit 18 may be configured to process information from the rain sensor 22a and the thermometer 22c to determine if the surface condition 24 is wet, snow, snow with ice or snow with slush.

The method 200 includes block 250, processing the state of the traffic signal 14, the speed of the automotive vehicle 12, the distance between the automotive vehicle 12 and the traffic signal 14, and the surface condition 24 of the road driven on by the automotive vehicle 12 so as to determine the action to be taken by the automotive vehicle 12. In particular, the data processing unit 18 may process the speed of the automotive vehicle 12 and the surface condition 24 to determine a distance to stop. The data processing unit 18 may further process the distance to stop with the distance between the automotive vehicle 12 and the traffic signal 14 so as to determine if the automotive vehicle 12 can stop before the intersection so as to determine an action to be taken by the automotive vehicle 12. The action to be taken may include either slowing down to a stop at the traffic signal 14 or continue through the traffic signal 14. It should be appreciated that the action to be taken may include a command to an active control system 38 so as to maneuver the automotive vehicle 12.

The method may further include block 260, determining the type of road 30 being driven on. Block 260 may be executed by the third sensor unit 22. For example, the third sensor unit 22 may further include a vibration sensor 22f. The vibration sensor 22f is configured to detect the vibration of the automotive vehicle 12. The vibration of the automotive vehicle 12 is processed by the data processing unit 18 so as to determine a type of road the automotive vehicle 12 is being driven on, wherein the type of road is one selected from the type consisting of paved, dirt or asphalt.

The method may further include block 270, determining the coefficient of friction of the type of road. The coefficient of friction is determined by processing the type of road, the surface condition 24 and retrieving the value of the coefficient of friction from a database 34. The coefficient of friction and the speed of the automotive vehicle 12 and the weight of the vehicle are used to calculate a distance to stop. For instance, the stopping distance may be calculated by the data processing unit 18 using the equation: $d = V^2 / 2\ \mu g$, wherein "d" is the distance to stop, "V" is the speed of the automotive vehicle 12, "$\mu$" is the coefficient of friction of the road type based upon the surface condition 24, and "g" is the weight of the automotive vehicle 12. The database 34 may be populated by table of coefficient of friction, an example of tables, labeled Table 1 and Table 2, for use herein are provided above for reference herein. It should be appreciated that the distance to stop is the distance being the distance required for the automotive vehicle 12 to stop after executing a braking action.

The method 200 may further block 280, providing an active control system 38 and processing the distance to stop so as to determine the action to be taken by the automotive vehicle 12. The action to be taken by the automotive vehicle 12 is transmitted to the active control system 38 and executed by the active control system 38. The active control system 38 includes an active steering system 40 configured to control the steering of the automotive vehicle 12, an active braking system 42 configured to control the braking of the automotive vehicle 12, and an active acceleration system 44 configured to control the acceleration of the automotive vehicle 12.

The method 200 may further include block 290, gathering a system vehicle information 48 from a system vehicle 26 so as to determine the action to be taken by the automotive vehicle 12. In such an aspect the automotive vehicle 12 and the system vehicle 26 are configured for vehicle-to-vehicle communications. The vehicle information being the distance between the system vehicle 26 and the automotive vehicle 12 and the speed of the system vehicle 26, processing the system vehicle information 48 along with the distance to stop, the state of the traffic signal 14, the speed of the automotive vehicle 12, the distance between the automotive vehicle 12 and the traffic signal 14, and the surface condition 24 of the road driven on by the automotive vehicle 12 so as to determine the action to be taken by the automotive vehicle 12.

Figure 3:
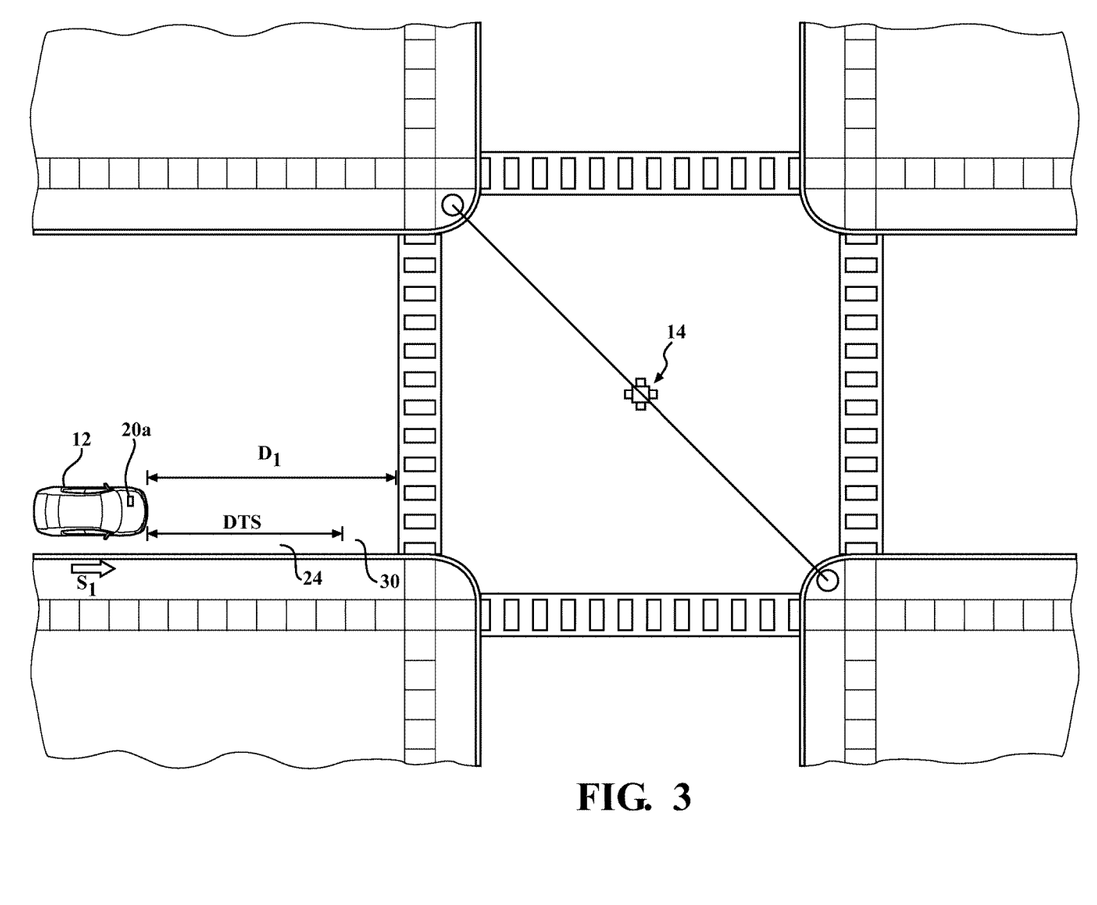
FIG. 3 schematically depicts an overhead view of an automotive vehicle approaching a traffic signal on a wet road.

Referring now to FIGS. 3-6, an illustrative example of the operation of the system 10 is provided. With reference first to FIG. 3, the automotive vehicle 12 is shown approaching a traffic signal 14. The automotive vehicle 12 is a distance "$D_1$" from the crosswalk and traveling at a speed of "$S_1$". The distance "$D_1$" and speed "$S_1$" may be detected by the first sensor unit 16.

The second sensor unit 20 determines a state of the traffic signal 14. The second sensor is illustratively shown as a camera 20a having an image processor. The camera 20a is mounted to a front windshield of the automotive vehicle 12. The camera 20a obtains a camera image 20b which is processed by the image processor to determine the state of the traffic signal 14. For instance, the camera image 20b may be processed so as to detect which light of the traffic signal 14 is illuminated.

The third sensor detects the surface condition 24 of the road. The third sensor of the illuminated embodiment is a rain sensor 22a unit mounted to the windshield. For illustrative purposes, FIG. 3 shows that there is no rain fall and thus the data processing unit 18 makes determination that the surface condition 24 of the road is dry.

The data processing unit 18 processes the distance "$D_1$", speed "$S_1$", and the surface condition 24 of the road to determine a distance to stop, "DTS". The data processing unit 18 further processes the state of the traffic signal 14 with the distance "$D_1$" to determine an action to be taken for the automotive vehicle 12. In the instant case, it is assumed that the distance to stop "DTS" is less than the distance "$D_1$", and that the state of the traffic signal 14 is a yellow light.

Accordingly, the data processing unit 18 determines that the action to be taken by the automotive vehicle 12 is to begin braking so as to stop at the intersection. In one aspect of the system 10, an instruction to begin braking is transmitted through the speaker. In another aspect of the system 10, the data processing unit 18 instructs the active control system 38 to initiating the braking system 10 so as to automatically stop the automotive vehicle 12 at the traffic signal 14.

Figure 4:
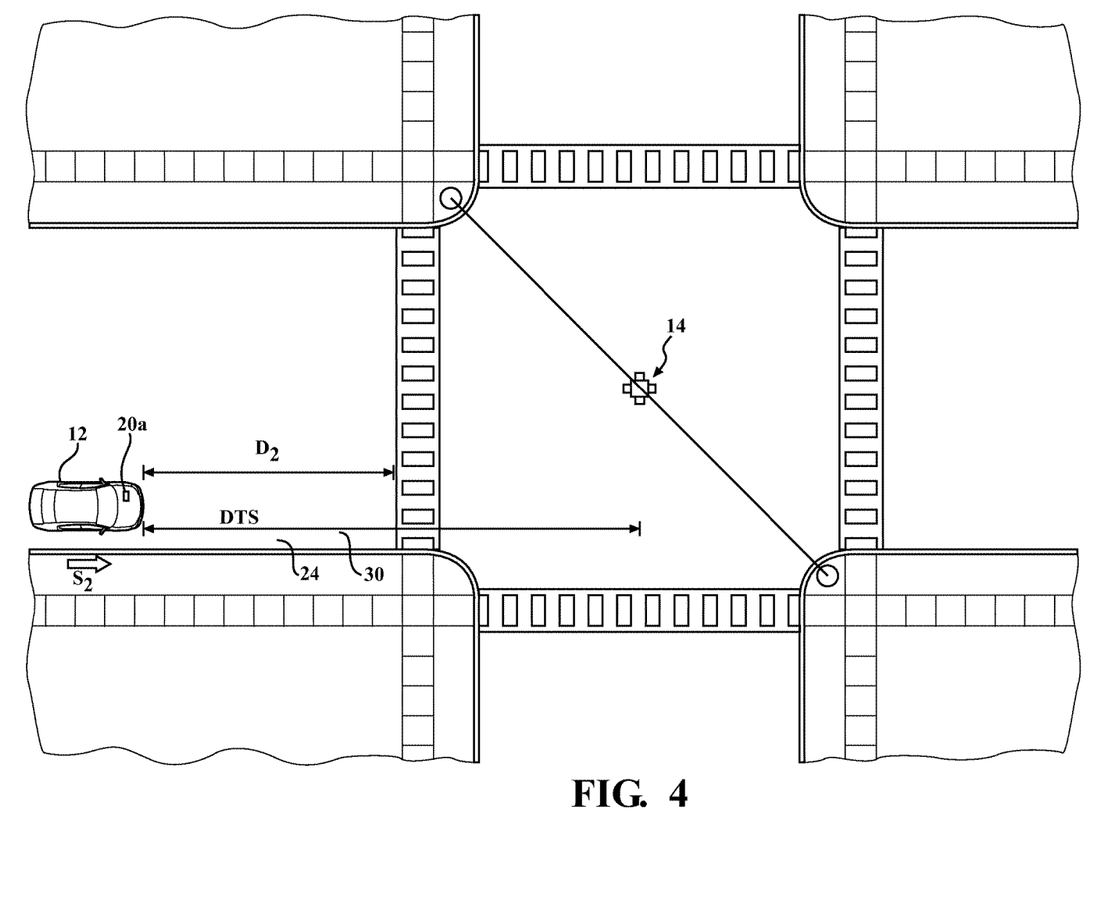
FIG. 4 schematically depicts an overhead view of an automotive vehicle approaching a traffic signal on an icy road.

With reference now to FIG. 4, the automotive vehicle 12 is again shown approaching a traffic signal 14. The automotive vehicle 12 is a distance "$D_2$" from the crosswalk and traveling at a speed of "$S_2$". The distance "$D_2$" and speed "$S_2$" may be detected by the first sensor unit 16.

The second sensor unit 20 determines a state of the traffic signal 14. For illustrative purposes, it is assumed that the second sensor unit 20 determines that the state of the traffic signal 14 is a green light. It is further assumed that the third sensor unit 22 detects the surface condition 24 of the road as wet. As with the example explained in FIG. 3, the third sensor unit 22 is a rain sensor 22a functioning in cooperation with an automatic windshield wiper system 10.

It is further assumed that the third sensor unit 22 determines that the type of road 30 is asphalt. The type of road 30 may be determined by a camera 22d, for example, wherein the camera image 20b provided by the camera 22d is processed by the data processing unit 18. As described above, the third sensor unit 22 may also include a vibration sensor 22f. Vibrations may be processed by the data processing unit 18 to determine the type of road 30 being driven on. The data processing unit 18 processes a detection of rain to determine that the surface condition 24 of the road is wet. It should also be appreciated that the data processing unit 18 may determine that the road is wet based upon the duration of detected rain fall. Accordingly, the data processing unit 18 may determine that the road is wet even after the rain sensor 22a has detected that no rain is falling.

The data processing unit 18 may access the database 34 so as to find a coefficient of friction of asphalt from the list of coefficient of frictions 38. The coefficient of friction, the distance "$D_2$", speed "$S_2$", and may be processed by the data processing unit to determine a distance to stop "DTS". As an example and not a limitation, such a determination may be made by calculation of the following equation: $d=V^2/2\ \mu g$, wherein "d" is the distance to stop, "V" is the speed of the automotive vehicle, "$\mu$" is the coefficient of friction of the road type based upon the surface condition, and "g" is the weight of the automotive vehicle.

In the instant case, it is assumed that the speed "$S_2$" is the same as the speed "$S_1$". However, for illustrative purposes, the distance "$D_2$" to the crosswalk is longer than the distance "$D_1$" described in FIG. 3. The data processing unit 18 processes the speed "$S_2$" and distance "$D_2$" to the traffic signal 14 along with the surface condition 24 of the road to determine the distance to stop "DTS" is shorter than "$D_2$".

The data processing unit 18 further processes the state of the traffic signal 14 with the distance to stop to determine an action to be taken for the automotive vehicle 12. In the instant case, assume that the distance to stop is more than the distance $D_2$, and that the state of the traffic signal 14 is a green light. Accordingly, the data processing unit 18 determines that the action to be taken by the automotive vehicle 12 is to continue traveling at the current speed "$S_2$".

Figure 5:
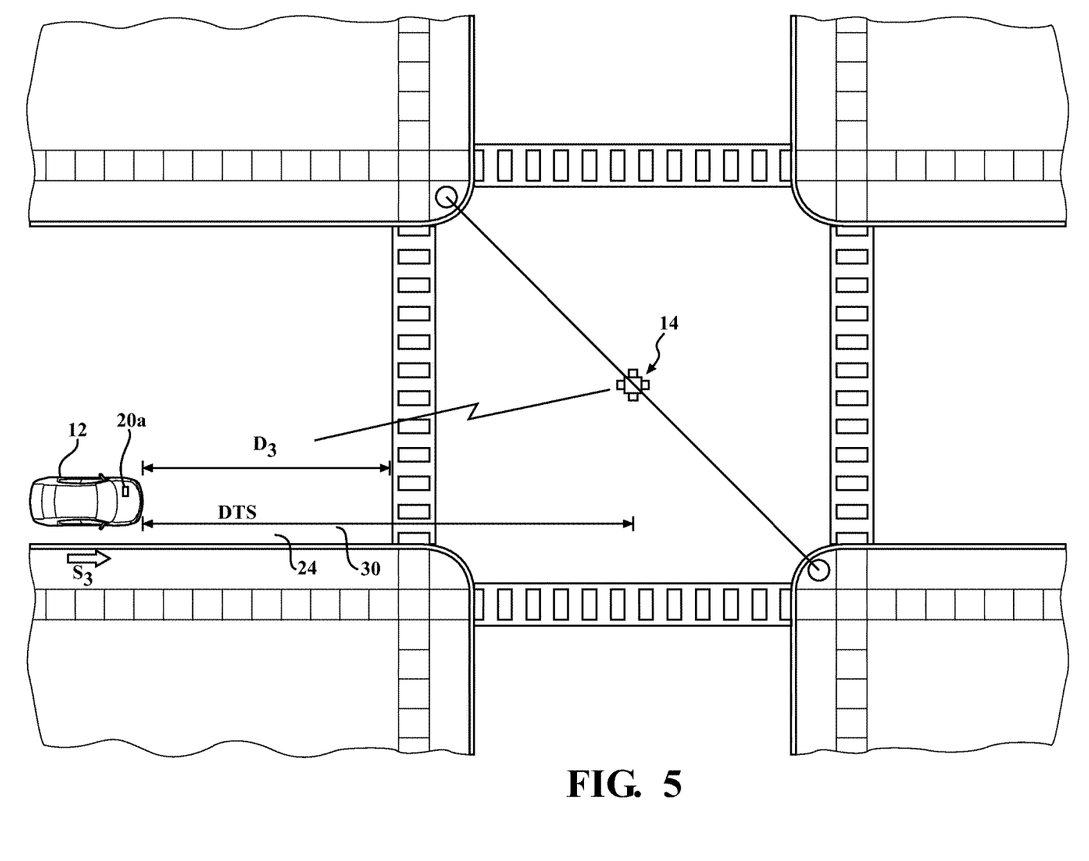
FIG. 5 schematically depicts an overhead view of an automotive vehicle approaching a traffic signal and a system vehicle trailing behind the automotive vehicle.

With reference now to FIG. 5, the automotive vehicle 12 is again shown approaching a traffic signal 14. The automotive vehicle 12 is a distance "$D_3$" from the crosswalk and traveling at a speed of "$S_3$". The distance "$D_3$" and speed "$S_3$" may be detected by the first sensor unit 16.

The second sensor unit 20 determines a state of the traffic signal 14. For illustrative purposes, it is assumed that the second sensor unit 20 determines that the state of the traffic signal 14 is a yellow light. The type of road 30 may be determined by a camera 22d, for example, wherein the camera image is processed by the data processing unit 18. As described above, the third sensor unit 22 may include a vibration sensor 22f. Vibrations may be processed by the data processing unit 18 to determine the type of road 30 being driven on.

For illustrative purposes, it is assumed that the third sensor unit 22 detects the surface condition 24 of the road as icy. As with the example explained in FIG. 3, the third sensor unit 22 is a rain sensor 22a functioning in cooperation with an automatic windshield wiper system 10 and thus the windshield wipers are also actuated. The third sensor unit 22 may also include a thermometer 22c configured to detect the environmental temperature. The data processing unit 18 processes a detection of rain and temperature to determine that the surface condition 24. In the instant case, it is assumed that the temperature detected by the thermometer 22c is 25 degrees Celsius. The data processing unit 18 processes the wet condition with the temperature to determine that the surface condition 24 of the road is icy.

The data processing unit 18 processes the distance to the intersection "$D_3$", speed "$S_3$", and the surface condition 24 of the road and the type of road 30 to determine a distance to stop. In the instant case, assume that the speed "$S_3$" is the same as the speed "$S_2$". However, for illustrative purposes, the distance "$D_3$" to the traffic signal 14 is longer than the distance "$D_1$" described in FIG. 3. The data processing unit 18 processes the speed "$S_3$" and distance "$D_3$" to the traffic signal 14 along with the surface condition 24 of the road to determine the distance to stop "DTS".

The data processing unit 18 further processes the state of the traffic signal 14 with the distance to stop to determine an action to be taken for the automotive vehicle 12. In the instant case, assume that the distance to the intersection is less than the distance "$D_2$", and that the state of the traffic signal 14 is a yellow light. For illustrative purposes, the second sensor unit 20 is further configured to receive the signal phase and timing the traffic signal 14. In such an aspect, the second sensor unit 20 may further configured to include a short range wireless antenna 20c for receiving wireless. Further assume that the distance to stop "DTS" takes the automotive vehicle 12 beyond the road intersection.

For illustrative purposes, assume that the data processing unit 18 processes the distance to stop, the speed "$S_3$" and the signal phase and timing of the traffic signal 14 to determine that the automotive vehicle 12 may past the traffic intersection before the state of the traffic signal 14 changes to red, and the state of the traffic signals 14 of the crossing traffic turns green. Accordingly, data processing unit 18 determines that the action to be taken by the automotive vehicle 12 is to continue traveling at speed "$S_3$" across the intersection. In one aspect of the system 10, the data processing unit 18 may provide a verbal warning to the driver to watch for crossing traffic.

Figure 6:
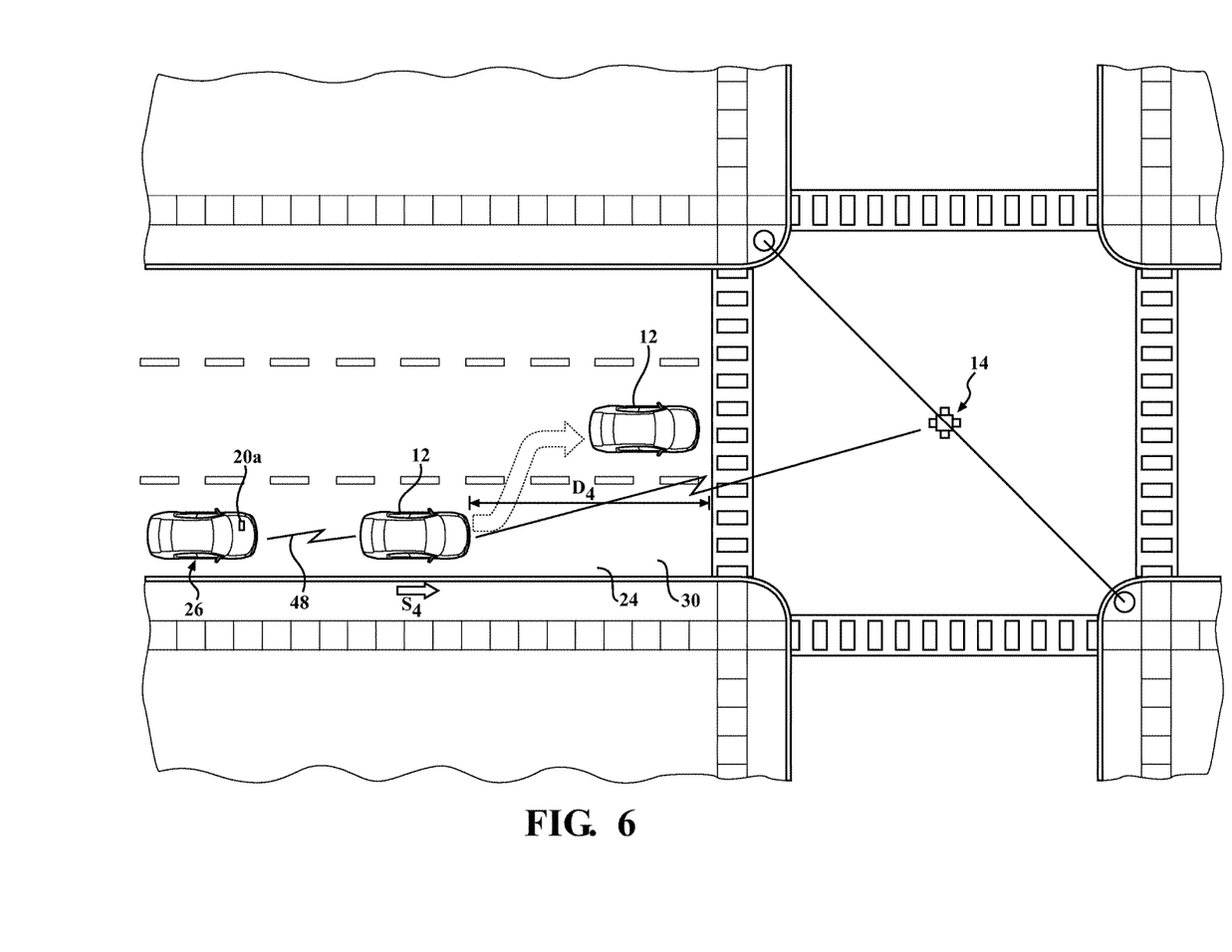
FIG. 6 graphically depicts a flowchart illustrating a method of determining an action of an automotive vehicle to be taken as the automotive vehicle approaches a traffic signal, according to one or more embodiments described and illustrated herein.

With reference now to FIG. 6, the automotive vehicle 12 is again shown approaching a traffic signal 14. The automotive vehicle 12 is a distance "$D_4$" from the crosswalk and traveling at a speed of "$S_4$". The distance "$D_4$" and speed "$S_4$" may be detected by the first sensor unit 16.

The second sensor unit 20 determines a state of the traffic signal 14. For illustrative purposes, it is assumed that the second sensor unit 20 determines that the state of the traffic signal 14 is a yellow light. For illustrative purposes, it is assumed that the third sensor unit 22 detects the surface condition 24 of the road as dry. The third sensor detects the surface condition 24 of the road. The third sensor unit 22 of the illustrative embodiment is a rain sensor 22a unit mounted to the windshield of the automotive vehicle 12. For illustrative purposes, FIG. 5 shows that there is no rain fall and thus the data processing unit 18 makes determination that the surface condition 24 of the road is dry.

FIG. 6 further shows the third sensor further configured to detect the type of road the automotive vehicle 12 is driving on. For illustrative purposes, the third sensor unit 22 may include a vibration sensor 22f or a camera 20a. In accordance with an aspect of the system 10 wherein the third sensor is a camera 20a, the camera image 20b is processed to determine the type of road being driven on. The camera 20a may be configured to film the road surface and the image processor processes the image of the road surface so as to determine if the road surface is paved, dirt or gravel.

FIG. 6 shows a system vehicle 26. The system vehicle 26 is positioned behind the automotive vehicle 12. The system vehicle 26 is includes a short range wireless antenna 20c configured to transmit the system vehicle information 48 to the automotive vehicle 12. The system vehicle information 48 includes the speed of the system vehicle 26 and the distance between the system vehicle 26 and the automotive vehicle 12.

The data processing unit 18 processes the distance "$D_4$", speed "$S_4$", and the surface condition 24 of the road and the road type to determine a distance to stop. In the instant case, assume that the speed "$S_4$" is the same as the speed "$S_3$". The data processing unit 18 processes the speed "$S_4$" and distance "$D_4$" to the traffic signal 14 along with the surface condition 24 of the road to determine the distance to stop is shorter than "$D_4$".

The data processing unit 18 further processes the state of the traffic signal 14 with the distance to stop to determine an action to be taken for the automotive vehicle 12. In the instant case, it is assumed that the distance to stop "DTS" is less than the distance "$D_4$", and that the state of the traffic signal 14 is a yellow light. For illustrative purposes, the second sensor unit 20 is further configured to receive the signal phase and timing the traffic signal 14.

Accordingly, the data processing unit 18 may transmit a braking command to the active control system 38 of the automotive vehicle 12. The data processing unit 18 may further transmit to the system vehicle 26 following the automotive vehicle 12 that that automotive vehicle 12 is braking. The automotive vehicle 12 may communicate with the system vehicle 26 over a vehicle-to-vehicle network using transceivers.

Assume for illustrative purpose, that the system vehicle 26 cannot complete a full stop before reaching the automotive vehicle 12. The system vehicle 26 communicates to the automotive vehicle 12 through the vehicle-to-vehicle network that it cannot make said complete stop. The data processing unit 18 may process such information from the system vehicle 26 so as to actuate the active control system 38 to execute an action to avoid a rear end collision. The data processing unit 18 may further transmit such action to the system vehicle 26 so as to inform the system vehicle 26 of the action.

For instance, the data processing unit 18 may command the active control system 38 to move to the left lane so as to allow the system vehicle 26 to complete the stop at the intersection. The command is transmitted to the system vehicle 26 so as to prevent the system vehicle 26 from also moving to the same lane as the automotive vehicle 12.

Accordingly, it should now be understood that the embodiments described herein provides a driver with a driving action to be taken when approaching a traffic signal so as to help the driver make a safe driving action. Further, the driving action is calculated utilizing the road surface condition so as to provide an accurate distance to stop. Accordingly, the driver is provided with greater certainty when approaching the traffic signal.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

We claim:

1. A system for use in an automotive vehicle, the system configured to determine an action to be taken by the automotive vehicle as the automotive vehicle approaches a traffic signal, the system comprising:
    a first sensor unit configured to provide a speed of the automotive vehicle and determine a distance between the automotive vehicle and the traffic light;
    a second sensor unit configured to detect the state of the traffic light;
    a third sensor unit configured to determine a type of road driven on by the automotive vehicle and to detect a surface condition, to include moisture, of a road driven on by the automotive vehicle, wherein the third sensor unit further includes a vibration sensor configured to detect the vibration of the automotive vehicle, wherein the type of road is one from the group consisting of asphalt, concrete, gravel, dirt, loose dirt, grass and brick;
    a non-transitory computer readable medium storing a database, the database storing a list of coefficient of frictions, the list of coefficient of frictions containing a coefficient of friction for a plurality of road surfaces and a coefficient of friction for one or more road conditions for one or more road surfaces of the plurality of road surfaces; and
    a data processing unit configured to receive the state of the traffic light, the speed of the automotive vehicle and the distance between the automotive vehicle and the traffic light, wherein the data processing unit processes the vibration of the automotive vehicle to determine the type of road the automotive vehicle is being driven on and selects a coefficient of friction from the list of coefficient of frictions corresponding to the road surface and road condition of the type of road driven on by the automotive vehicle, wherein the data processing unit is configured to process the state of the traffic light, the speed of the automotive vehicle, the distance between the automotive vehicle and the traffic light, the surface condition of the road and the coefficient of friction of the road surface driven on by the automotive vehicle to determine the action to be taken by the automotive vehicle.

2. The system according to claim 1, wherein the first sensor unit is a speedometer providing the speed of the automotive vehicle and a radar providing the distance between the automotive vehicle and the traffic light.

3. The system according to claim 1, wherein the second sensor unit is a camera, the data processing unit configured to process a camera image so as to detect the state of the traffic light.

4. The system according to claim 1, wherein the third sensor unit is a rain sensor, the rain sensor configured to detect rain fall, the data processing unit processing the rain fall so as to determine surface condition of a road driven.

5. The system according to claim 4, wherein the third sensor unit further includes a thermometer, wherein the data processing unit is configured to process information from the rain sensor and the thermometer so as to determine the surface condition of a road driven.

6. The system according to claim 1, further including an active control system wherein the data processing unit transmits at least one signal to the active control system corresponding to the action such that the active control system executes the action by controlling the automotive vehicle.

7. The system according to claim 6, wherein the active control system includes an active steering system configured to control a steering of the automotive vehicle, an active braking system configured to control a braking of the automotive vehicle, and an active acceleration system configured to control an acceleration of the automotive vehicle.

8. A method for determining an action to be taken by an automotive vehicle as the automotive vehicle approaches a traffic signal, the method comprising:
- detecting a speed of the automotive vehicle within a predetermined distance of the traffic signal;
- determining a distance to stop;
- detecting the state of the traffic light;
- detecting a surface condition of a road driven on by the automotive vehicle;
- detecting a type of road driven on by the automotive vehicle by processing a vibration of the automotive vehicle, wherein the type of road is one from the group consisting of asphalt, concrete, gravel, dirt, loose dirt, grass and brick;
- determining a coefficient of friction of the surface condition and type of the road driven on; and
- processing, by a data processing unit, the state of the traffic light, the speed of the automotive vehicle, the distance to stop, and the coefficient of friction of the surface condition and the type of road driven on by the automotive vehicle to determine the action to be taken by the automotive vehicle.

9. The method according to claim 8, wherein the speed is provided by a speedometer and the distance to stop is provided by a radar.

10. The method according to claim 9, a camera provides a camera image of the traffic light and the camera image is processed by the data processing unit to detect the state of the traffic light.

11. The method according to claim 10, wherein a rain sensor detects precipitation and the data processing unit processing the precipitation so as to determine surface condition of a road driven.

12. The method according to claim 11, wherein a thermometer determines a temperature and the data processing unit processes information from the rain sensor and the thermometer so as to determine the surface condition of the road.

13. The method according to claim 8, further including transmitting a signal corresponding to the action to be taken to an active control system, such that the action to be taken is executed by the active control system.

14. The method according to claim 13, wherein the active control system includes an active steering system configured to control a steering of the automotive vehicle, an active braking system configured to control a braking of the automotive vehicle, and an active acceleration system configured to control an acceleration of the automotive vehicle.

15. The method according to claim 14, further including:
- gathering a system vehicle information from a system vehicle, the vehicle information being the distance between the system vehicle and the automotive vehicle and the speed of the system vehicle; and
- processing the system vehicle information along with the distance to stop, the state of the traffic light, the speed of the automotive vehicle, the distance between the automotive vehicle and the traffic light, and the surface condition of the road driven on by the automotive vehicle so as to determine the action to be taken by the automotive vehicle.

16. The method according to claim 8, including wherein a speedometer provides the speed of the automotive vehicle and a camera provides a camera image, the camera image being a field of view forward of the automotive vehicle, and the camera image being processed by the data processing unit to provide the distance to stop.

* * * * *